(No Model.)   2 Sheets—Sheet 1.

N. FINK.
CORN HARVESTER.

No. 463,033.   Patented Nov. 10, 1891.

Witnesses
John Amirie
Wm. S. Hodges

Inventor
Noah Fink
By his Attorney

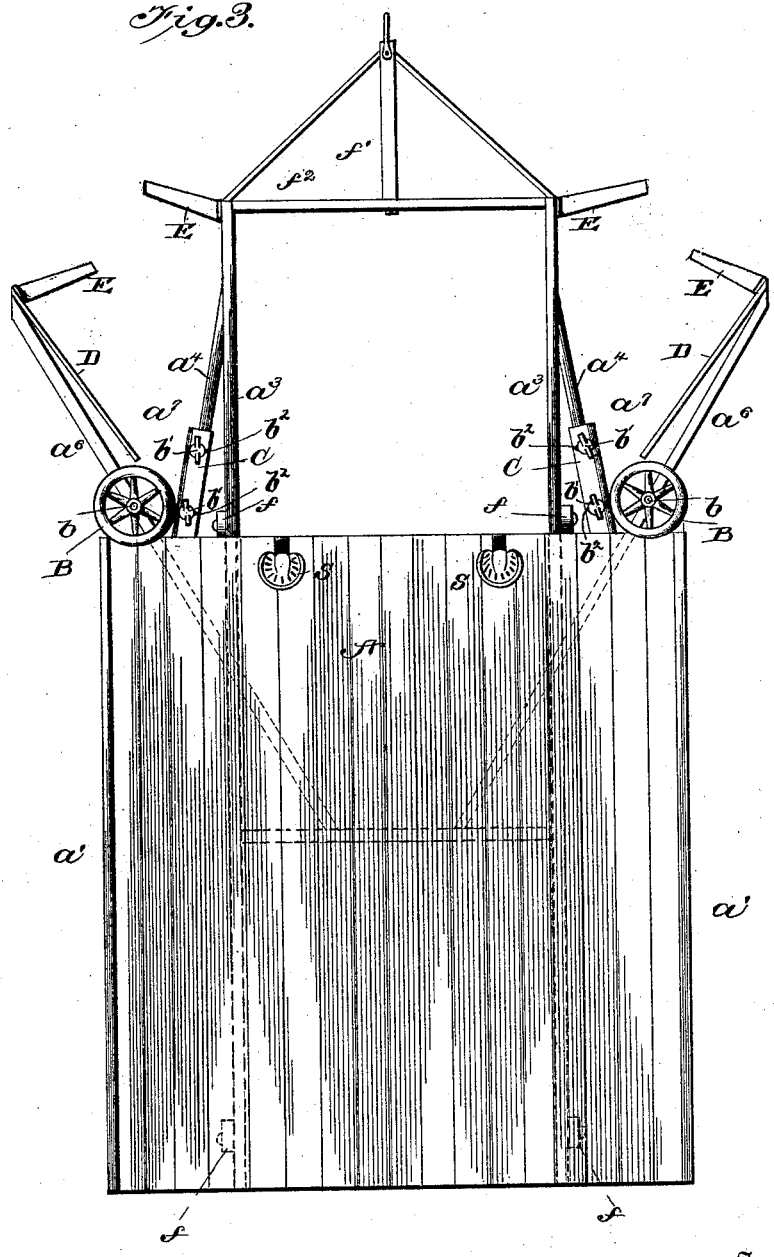

UNITED STATES PATENT OFFICE.

NOAH FINK, OF CHENEY, KANSAS.

CORN-HARVESTER.

SPECIFICATION forming part of Letters Patent No. 463,033, dated November 10, 1891.

Application filed December 23, 1890. Serial No. 375,621. (No model.)

*To all whom it may concern:*

Be it known that I, NOAH FINK, a citizen of the United States of America, residing at Cheney, in the county of Sedgwick and State of Kansas, have invented certain new and useful Improvements in Corn-Harvesters, of which the following is a specification, reference being had therein to the accompanying drawings.

This invention pertains to certain new and useful improvements in corn-harvesters, having for its object the production of simple and highly-efficient means for readily and easily effecting the cutting of the corn of one or two rows.

The invention comprises a platform or sled having stationary and revolving cutting-knives, arms or guides for guiding the cornstalks between and to said knives, and picker-arms for raising fallen stalks from the ground, substantially as hereinafter fully set forth, and particularly pointed out in the claim.

Figure 1:
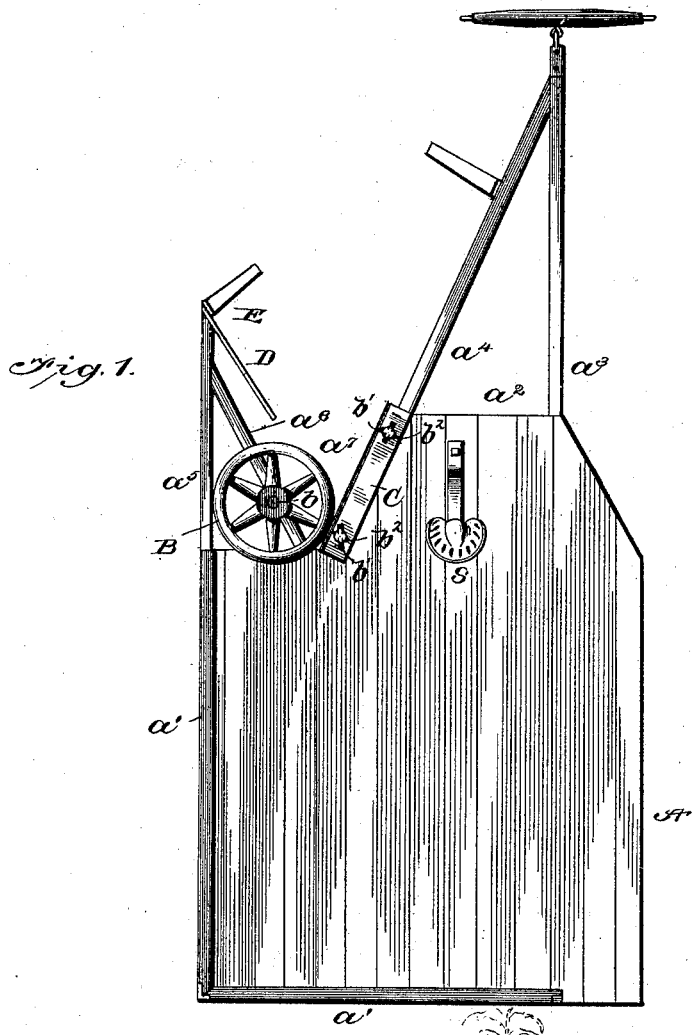
Figure 2:
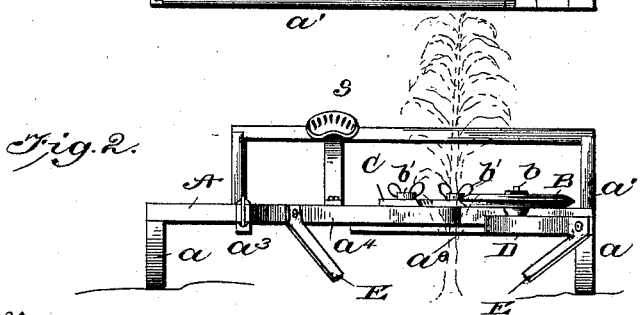

In the accompanying drawings, Figure 1 is a plan view of my improved harvester for cutting a single row of stalks. Fig. 2 is a front end view thereof. Fig. 3 is a view showing my invention as adapted for cutting double rows simultaneously.

Referring to Figs. 1 and 2, A designates the platform or sled; $a$, side runners therefor, and $a'$ the bars for retaining the stalks on the platform or sled. To an extension $a^2$ of platform A is secured a bar $a^3$, to which the draft-horse is connected, and to this bar is secured a second or divergent bar $a^4$, rigidly attached at its inner end to the side of said extension $a^2$. To an outwardly-extending bar $a^5$ is secured a second divergent bar $a^6$, which, together with bar $a^4$, forms a V-shaped jaw or opening $a^7$.

B is a rotary cutting wheel or knife journaled on the upper end of a rod $b$, connected to bar $a^6$.

C is a stationary knife adjustably secured to the bar $a^4$ at the inner end thereof opposite to the rotary cutting wheel or knife, the edges of which are brought into close juxtaposition to each other. This knife can be adjusted with relation to the rotary cutting-wheel B by means of thumb-screws $b'$, projected through slots $b^2$ in said knife and working in apertures of bar $a^4$.

To the outer end of bar $a^5$ is secured an arm or guard D, which projects divergently inwardly toward the rotary cutting-knife and extends just beyond the longitudinal line passing through the center of the latter. The object of this arm or guard is to direct the cornstalks to the action of the knives and cause them to pass between the stationary knife and that side of the rotary knife adjacent to said stationary knife. The driver is preferably located on seat S, so as to be able to grasp the stalks with his left arm and throw the same onto the platform.

E E are the picker-arms, secured, respectively, to bars $a^4$ $a^5$ and projected inwardly toward the row of corn being cut, so as to raise all fallen stalks and guide the same toward the knives.

The operation is obvious. The harvester is so placed that the cornstalks will be gathered in the V-shaped jaw or opening, when upon coming in contact with the rotary knife they will cause the latter to turn and with the aid of the stationary knife effect the cutting of the stalks, which are then gathered onto the platform until such time as their removal is found necessary.

It is obvious that with slight modification the invention can be made applicable to two or more rows of corn, the cutting of the stalks being effected simultaneously. Such form is shown in Fig. 3, wherein the platform A is preferably mounted on wheels $f$, and two series of cutting-knives are used instead of one. In this form the draft horse or horses are connected to a tongue $f'$, secured to the center of a cross-bar $f^2$, rigidly attached to the outer ends of the bars $a^3$. In this form two drivers or operators are necessary, and hence the seats, like the other parts, are duplicated.

The advantages of my invention will be apparent to those skilled in the art to which it appertains, and it will be especially observed that the same is extremely simple, cheap, and durable, and not liable to readily get out of order, and that the cutting operation is readily and easily accomplished.

I claim as my invention—

The herein-described corn-harvester, comprising the platform, the forward converging bars $a^4$ $a^6$, secured to said platform at their inner ends, the stationary knife C, secured to the bar $a^4$ at the inner end thereof and transversely adjustable thereon, the spindle $b$, secured to the bar $a^6$, the rotary cutting-wheel loosely mounted thereon, the arm or guard secured at its outer end and having its inner end extended beyond a longitudinal line passing through the center of said rotary cutting-wheel, and the picker-arms E, substantially as described.

In testimony whereof I affix my signature in presence of two witnesses.

NOAH FINK.

Witnesses:
O. E. WELLER,
H. E. McELROY.